United States Patent
Xiao et al.

(10) Patent No.: US 9,695,740 B2
(45) Date of Patent: Jul. 4, 2017

(54) METHODS AND SYSTEMS FOR BOOST CONTROL

(71) Applicant: Ford Global Technologies, LLC, Dearborn, MI (US)

(72) Inventors: Baitao Xiao, Canton, MI (US); Hamid-Reza Ossareh, Ann Arbor, MI (US); John Erik Mikael Hellstrom, Ann Arbor, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 14/799,342

(22) Filed: Jul. 14, 2015

(65) Prior Publication Data

US 2017/0016389 A1 Jan. 19, 2017

(51) Int. Cl.
| F02B 37/16 | (2006.01) |
| F02B 37/14 | (2006.01) |
| F02B 37/04 | (2006.01) |
| F02B 39/10 | (2006.01) |
| F02D 41/00 | (2006.01) |
| F02B 37/12 | (2006.01) |
| F02B 39/16 | (2006.01) |

(52) U.S. Cl.
CPC ............. *F02B 37/14* (2013.01); *F02B 37/04* (2013.01); *F02B 37/127* (2013.01); *F02B 37/16* (2013.01); *F02B 39/10* (2013.01); *F02D 41/0007* (2013.01); *F02B 2037/122* (2013.01); *F02B 2039/168* (2013.01); *F02D 2200/0406* (2013.01)

(58) Field of Classification Search
CPC ........ F02B 37/04; F02B 37/127; F02B 37/14; F02B 37/16; F02B 2037/122
See application file for complete search history.

(56) References Cited

U.S. PATENT DOCUMENTS

| 4,459,809 | A | 7/1984 | Tadokoro et al. |
| 4,513,571 | A | 4/1985 | Jenny et al. |
| 7,210,296 | B2 | 5/2007 | Bolz et al |
| 7,251,989 | B2* | 8/2007 | Baeuerle .............. F02B 39/16 |
| | | | 73/114.37 |
| 7,958,727 | B2 | 6/2011 | Arnold |
| 7,958,730 | B2 | 6/2011 | Stewart |
| 8,164,208 | B2 | 4/2012 | Rosson et al. |
| 8,176,735 | B2 | 5/2012 | Komatsu |
| 8,220,245 | B1 | 7/2012 | Papandreas |
| 2012/0079824 | A1* | 4/2012 | Son ..................... F02B 33/40 |
| | | | 60/602 |

(Continued)

OTHER PUBLICATIONS

Ossareh, Hamid-Reza et al., "Method and System for Engine Speed Control," U.S. Appl. No. 14/927,070, filed Oct. 29, 2015, 33 pages.

(Continued)

*Primary Examiner* — Audrey K Bradley
(74) *Attorney, Agent, or Firm* — Julia Voutyras; McCoy Russell LLP

(57) ABSTRACT

Methods and systems are provided for turbocharger speed control in an engine system having multiple staged charge boosting devices. In one example, compressed air is provided by a turbocharger compressor until a turbocharger speed reaches a limit. Thereafter, a compressor of a downstream supercharger is operated to share the load.

19 Claims, 4 Drawing Sheets

(56) References Cited

U.S. PATENT DOCUMENTS

| | | | |
|---|---|---|---|
| 2012/0240910 A1 | 9/2012 | Yamashita et al. | |
| 2013/0333665 A1* | 12/2013 | Pursifull | F02B 37/04 123/399 |
| 2014/0053547 A1* | 2/2014 | Wade | F02C 9/18 60/599 |
| 2014/0127002 A1 | 5/2014 | Joergl et al. | |
| 2014/0208745 A1* | 7/2014 | Suhocki | F02B 37/04 60/611 |

OTHER PUBLICATIONS

Xiao, Baitao et al., "Methods and Systems for Boost Control," U.S. Appl. No. 14/799,289, filed Jul. 14, 2015, 34 pages.

Banker, Adam Nathan et al., "Method and System to Reduce Charge Air Cooler Condensation," U.S. Appl. No. 14/829,968, filed Aug. 19, 2015, 29 pages.

Xiao, Baitao et al., "Methods and Systems for Boost Control," U.S. Appl. No. 14/942,487, filed Nov. 16, 2015, 38 pages.

\* cited by examiner

METHODS AND SYSTEMS FOR BOOST CONTROL

FIELD

The present description relates generally to methods and systems for enabling pressure control in staged boosted engine systems configured with a turbocharger and a supercharger.

BACKGROUND/SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. Further, one or more intake charging devices may be staged in series or parallel to an intake turbocharger to improve turbocharged engine boost response.

One example of a multi-staged intake charging system is shown by Stewart in U.S. Pat. No. 7,958,730. Therein, a high pressure turbine is staged upstream of a low pressure turbine, each turbine coupled to a corresponding compressor. The multi-staged configuration allows for multiple degrees of freedom in the boosted engine system, thereby enabling the control of two set-points, one of which includes boost pressure.

However, the inventors herein have identified potential issues with such multi-staged systems. As one example, turbocharged engine systems may have several hardware limits, such as a maximum turbocharger shaft speed, which could be violated under high engine load or when operating a vehicle at high altitude. As such, turbocharger speed limits cannot be exceeded due to the potential for substantially immediate mechanical degradation. Current control systems may address this issue by clipping the maximum boost pressure when such a constraint violation is anticipated. Additionally, airflow actuators may be adjusted to reduce the boost pressure, such as by opening a wastegate and/or a compressor recirculation valve. However, the drop in boost output below the driver demanded boost pressure may result in a noticeable under-delivery of torque demand, and a drop in vehicle driveability. In addition, the vehicle operator's drive experience is degraded.

In view of these issues, a method for improving turbocharger component speed control in a boosted engine having multiple, staged charge boosting devices is provided. The method includes: bypassing a second compressor and providing a flow of compressed air to a piston engine via a first compressor; and in response to a shaft speed of the first compressor being at or above a threshold, accelerating the second compressor. In this way, turbocharger speed control is enabled without degrading boosted engine performance.

As one example, a boosted engine system may include an electric supercharger coupled upstream of a turbocharger. For example, the supercharger may be coupled upstream of a charge air cooler. During conditions when boost is required and while the turbine is spinning up, the electric supercharger may be used to provide compressed air to the engine. Then, once the turbine spins up, the turbocharger compressor may be used to provide compressed air to the engine, while bypassing the supercharger. A turbocharger shaft speed may be monitored based on, for example, the turbine speed or the turbocharger compressor speed. If the turbocharger compressor shaft reaches a speed limit (or if the turbocharger compressor or turbine speed reaches the speed limit) while the demanded boost pressure is provided by the turbocharger, the electric supercharger may be spun up to reduce the load on the turbocharger. Specifically, the supercharger may be activated to share part of the total required power. Due to the load sharing between the turbocharger and the supercharger, the turbocharger operating speed is reduced. The supercharger compressor may be spun via one or more of an electric motor and the engine crankshaft at a speed that is based on the turbocharger shaft speed, the supercharger compressor speed increased as the turbocharger shaft speed exceeds the speed limit. In addition, a ratio of power delivered to the supercharger via the electric motor relative to the crankshaft may also be adjusted based on the turbocharger shaft speed. Once the turbocharger speed has been controlled, the supercharger may be disabled, and compressed air may once again be provided via the turbocharger.

The technical effect of sharing the boost load of a first, downstream turbocharger compressor via operation of a second, upstream supercharger compressor is that turbocharger compressor over-speed can be addressed without degrading boosted engine performance. By operating the supercharger to decrease the boost load provided by the turbocharger, a speed of the first compressor can be reduced without the need for reducing boost pressure at the first compressor via operation of a compressor recirculation valve or wastegate. By reducing the turbocharger speed, component life is extended. By using the supercharger to both reduce the turbocharger speed and maintain the boost pressure, under-delivery of torque demand is averted, and vehicle driveability is not degraded. Overall, the performance of a boosted engine system having staged charging devices is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
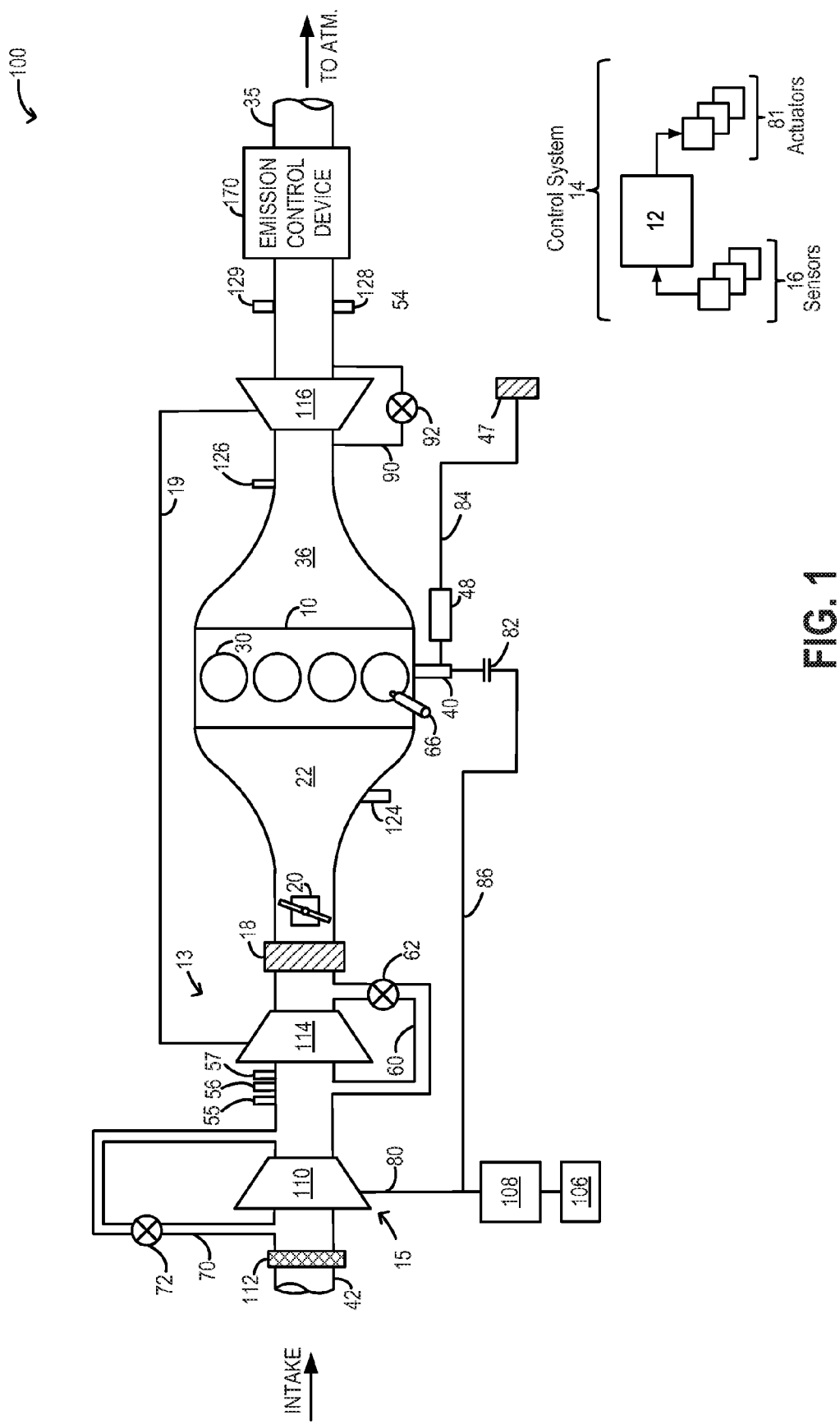
FIG. 1 shows an example embodiment of a boosted engine system having multiple staged charge boosting devices.

The following description relates to systems and methods for improving turbocharger speed control in an engine system having staged boosting devices, such as in the boosted engine system of FIG. 1. A controller may be configured to perform a routine, such as the example routines of FIGS. 2-3, to increase the speed of a downstream compressor to reduce the load, and thereby the temperature, of an upstream compressor. An example temperature control operation is shown with reference to FIG. 4. By operating the second compressor, over-temperature of the first compressor can be curbed while continuing to meet a driver torque demand.

FIG. 1 schematically shows aspects of an example engine system 100 including an engine 10. In the depicted embodiment, engine 10 is a boosted engine including multiple, staged boosting devices. Specifically, engine 10 includes a first boosting device 13 staged downstream of a second boosting device 15. The configuration results in a first compressor 114 (of the first boosting device) being positioned in the engine intake passage 42 downstream of a second compressor 110 (of the second boosting device). In the present example, the first boosting device is a turbocharger 13, while the second boosting device is an electric supercharger 15.

Turbocharger 13 includes first compressor 114 driven by a turbine 116. First compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air is introduced along intake passage 42 into engine 10 via air cleaner 112 and flows to second compressor 110. During selected conditions, as elaborated below, air compressed by turbocharger 13 may be recirculated from the outlet to the inlet of compressor 114 through first compressor bypass 60 by adjusting the opening of a compressor recirculation valve (CRV) 62. CRV 62 may be a continuously variable valve and increasing the opening of the recirculation valve may include actuating (or energizing) a solenoid of the valve.

As shown in FIG. 1, first compressor 114 is coupled, through charge-air cooler (CAC) 18 (herein also referred to as an intercooler) to throttle valve 20. Throttle valve 20 is coupled to engine intake manifold 22. Air is received at the first compressor from second compressor 110. From the first compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

Electric supercharger 15 includes second compressor 110 driven by electric motor 108. Specifically, the compressor fan is driven by power received from the electric motor along supercharger compressor shaft 80. Motor 108 is powered by an on-board energy storage device, such as system battery 106. Air compressed by second compressor 110 is then delivered to first compressor 114. Fresh air received at the compressor inlet of first compressor 114 is then introduced into engine 10. During selected conditions, as elaborated below, air may bypass supercharger 15 and be directed through second compressor bypass 70 by adjusting the opening of a bypass valve 72. During these conditions, compressed air may be delivered to engine 10 via first compressor 114 of the turbocharger only.

Second compressor 110 of supercharger 15 may additionally be driven by the engine crankshaft, via a clutch and gear mechanism. As such, engine torque may be transferred to vehicle wheels 47 via powertrain shaft 84. Specifically, engine torque may be relayed from crankshaft 40 to transmission 48, and thereon to wheels 47. Transmission 48 may be a fixed ratio transmission including a plurality of gear ratios to allow engine 10 to rotate at a different speed than wheels 47. A clutch (not shown) may be provided between engine crankshaft 40 and transmission 48. By changing a torque transfer capacity of the clutch (e.g., an amount of clutch slippage), an amount of engine torque relayed to the wheels via the powertrain shaft may be modulated. In addition to transferring engine torque to vehicle wheels, engine torque may be transferred to supercharger compressor shaft 80 via driveline 86. Specifically, engine torque may be relayed from crankshaft 40 to supercharger compressor shaft 80 at a location downstream of electric motor 108 via clutch 82. By changing a torque transfer capacity of clutch 82 (e.g., an amount of clutch slippage), an amount of engine torque used to drive the supercharger compressor (relative to the motor torque) may be modulated. While not shown, a plurality of gear ratios may be included in driveline 86 to allow engine 10 to rotate at a different speed than supercharger compressor 110. It will be appreciated that in alternate embodiments, driveline 86 may be coupled to the supercharger compressor shaft 80 at a location upstream of electric motor 108. A ratio of power driving the supercharger compressor electrically via the electric motor relative to power driving the supercharger compressor mechanically via the engine crankshaft may be adjusted based on engine operating conditions, as elaborated at FIG. 3.

It will be appreciated that, as used herein, first compressor refers to the downstream of the staged compressors and second compressor refers to the upstream of the staged compressors. In one non-limiting example, as depicted, the first downstream compressor is a turbocharger compressor while the second upstream compressor is a supercharger compressor. However, other combinations and configurations of boosting devices may be possible.

During selected conditions, such as during a tip-in, when going from engine operation without boost to engine operation with boost, turbo lag can occur. This is due to delays in turbine spin-up and reduced flow through first compressor 114 when the throttle opens at the tip-in. To reduce this turbo lag, during those selected conditions, both supercharger 15 and turbocharger 13 may be enabled. Specifically, while turbine 116 spins-up, boost pressure can be provided by the downstream supercharger compressor 110. Enabling the supercharger includes drawing energy from battery 106 to spin motor 108, to thereby accelerate second compressor 110. In addition, bypass valve 72 may be closed so as to enable a larger portion of air to be compressed by second compressor 110. Then, when the turbine has sufficiently spun up, and is capable of driving first compressor 114, the second compressor may be decelerated by disabling motor 108. In addition, bypass valve 72 may be opened so as to enable a larger portion of air to bypass second compressor 110.

As such, turbochargers may have several hardware limits, such as a maximum turbocharger shaft speed. If the turbocharger shaft speed exceeds this maximum value for a certain period of time, turbocharger stability may be degraded due to an immediate mechanical failure. As elaborated herein at FIGS. 2-3, during conditions when a constraint violation is detected or predicted, such as when it is predicted or detected that the turbocharger shaft speed (inferred based on the turbine speed or turbocharger compressor speed) will be higher than a threshold, the controller may reduce the load of the turbocharger compressor by enabling the supercharger compressor. Specifically, second compressor may be re-enabled and accelerated, resulting in a drop in load at the first compressor. By operating the second compressor to reduce the load of the first compressor, the turbocharger compressor speed of the first compressor can be reduced without requiring engine airflow to be clipped, and without under-delivering engine torque.

During selected conditions, such as during a tip-out, when going from engine operation with boost to engine operation without boost, or reduced boost, compressor surge can occur. This is due to a decreased flow through the first compressor when the throttle closes at the tip-out. The reduced forward flow through the first compressor can cause surge and degrade turbocharger performance. In addition, surge can lead to NVH issues such as undesirable noise from the engine intake system. To reduce compressor surge, at least a portion of the aircharge compressed by first compressor 114 may be recirculated to the compressor inlet. This allows excess boost pressure to be substantially immediately relieved. The compressor recirculation system may include a recirculation passage 60 including compressor recirculation valve 62 for recirculating (warm) compressed air from the compressor outlet of first compressor 114, upstream of charge-air cooler 18 to the compressor inlet of first compressor 114. In some embodiments, the compressor recirculation system may alternatively, or additionally, include a recirculation passage for recirculating (cooled) compressed air from the compressor outlet, downstream of the charge-air cooler to the compressor inlet.

One or both of valves 62 and 72 may be continuously variable valves wherein a position of the valve is continuously variable from a fully closed position to a fully open position. Alternatively, compressor recirculation valve 62 may be a continuously variable valve while compressor bypass valve 72 is an on-off valve. In some embodiments, CRV 62 may be normally partially open during boosted engine operation to provide some surge margin. Herein, the partially open position may be a default valve position. Then, in response to the indication of surge, the opening of CRV 62 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to improve boost response and peak performance.

One or more sensors may be coupled to an inlet of first compressor 114 (as shown) and/or second compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 114 and compressor 110, for determining a composition and condition of aircharge entering the compressor. These sensors may include, for example, manifold air flow sensor 57.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. Wastegate actuator 92 may be actuated open to dump at least some exhaust pressure from upstream of the turbine to a location downstream of the turbine via wastegate 90. By reducing exhaust pressure upstream of the turbine, turbine speed can be reduced.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap NO from the exhaust flow when the exhaust flow is lean, and to reduce the trapped NO when the exhaust flow is rich. In other examples, an exhaust after-treatment catalyst may be configured to disproportionate NO or to selectively reduce NO with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 114, second compressor 110, or both.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, and MAF sensor 57. Other sensors such as additional pressure, temperature, air/fuel ratio, and composition sensors may be coupled to various locations in engine system 100. The actuators 81 may include, for example, throttle 20, compressor recirculation valve 62, compressor bypass valve 72, electric motor 108, wastegate actuator 92, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-3.

Figure 2:
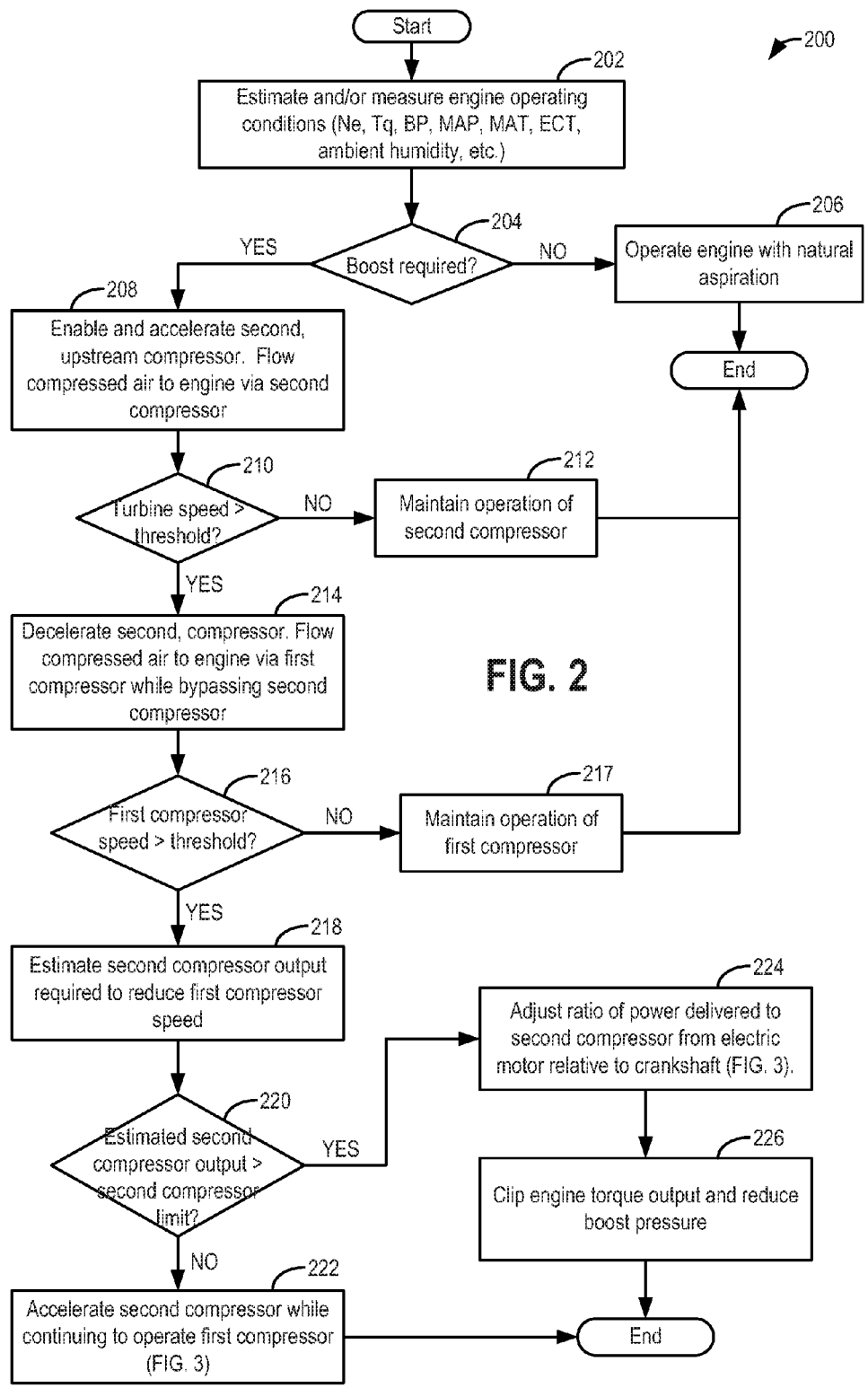
FIG. 2 shows a high level flow chart illustrating a routine that may be implemented for reducing the speed of a turbocharger compressor by operating a supercharger compressor.

Turning now to FIG. 2, an example routine 200 is shown for operating a compressor of an upstream boosting device (e.g., supercharger) in response to a temperature constraint of the compressor of a downstream boosting device (e.g., turbocharger). Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating engine operating conditions, such as engine speed, pedal position, operator torque demand, ambient conditions (ambient temperature, pressure, humidity), engine temperature, etc. At 204, the method includes determining if boost is required. In one example, boost may be required at mid-high engine loads. In another example, boost may be required in response to an operator pedal tip-in or increase in driver torque demand. If boost is not required, such as when the engine load is low or the driver torque demand is low, the method moves to 206 wherein the engine is operated with natural aspiration.

If boost is required, then at 208, the method includes, enabling a second, upstream compressor while a turbine coupled to a first, downstream compressor spins up. Herein, in response to an increase in driver demanded torque, the second compressor is accelerated and the flow of compressed air to the engine is increased. Herein the second compressor is staged upstream of the first compressor along an air intake passage. Further, the second compressor is driven by an electric motor while the first compressor is driven by an exhaust turbine. In one example, as shown with reference to FIG. 1, the first compressor is a turbocharger compressor while the second compressor is a supercharger compressor. Herein, accelerating the second compressor includes spinning the second compressor via the electric motor using power drawn from a battery. For example, the second compressor may be spun by adjusting an electromechanical actuator coupled to an electric motor of the supercharger to rotate the motor at a higher speed by sending a control signal from the controller to the actuator. The second compressor is accelerated at a speed based on the increase in boost demand. Thus, compressed air is provided to the engine via the second compressor.

As such, electric superchargers may have a response time (that is, idle to 100% duty cycle) of 130-200 ms and therefore may be able to deliver boost much faster compared to a typical turbocharger response time (1-2 second). Therefore, the second compressor of the electric supercharger may be able to fill the turbo lag significantly faster.

As exhaust heat and pressure develops due to cylinder combustion, the exhaust turbine speed increases, driving the first compressor. At 210, it is determined if the turbine speed is higher than a threshold, such as above a threshold where the turbocharger is able to sustain the boost demand. If not, operation of the second compressor (of the supercharger) is maintained at 212.

If turbine speed is higher than the threshold, then at 214, the method includes decelerating the second compressor, by disabling the electric motor for example based on a signal sent from the controller to an electromechanical actuator of the motor that reduces motor rotation speed. Additionally, a bypass valve (such as bypass valve 72) may be opened allowing air compressed by the first compressor to bypass second compressor and flow to the engine. Specifically, an electromechanical actuator coupled to the bypass valve in the bypass across the second compressor may be adjusted to rotate the bypass valve to a more open position by sending a control signal from the controller to the actuator. Thus, after the turbine has spun up sufficiently, the method includes bypassing the second compressor and providing a flow of compressed air to a piston engine via the first compressor. Herein, compressed air is not provided to the engine via the second compressor. In this way, by transiently operating the second compressor of the supercharger until the turbocharger turbine is spun up, turbo lag due to delays in spinning up the first compressor are reduced.

At 216, it may be determined if the shaft coupled to the first compressor is operating at or near a hardware limit, such as a shaft speed limit. Specifically, it may be determined if the speed of the shaft coupled to the first compressor shaft is at or above a threshold speed. In one example, it may be determined if the first compressor shaft speed is higher than 191,000 RPM. As such, since the turbocharger shaft couples the first compressor to the turbine, in an alternate examples, it may be determined if the first compressor speed is at or above the threshold speed, or if the turbine speed is at or above the threshold speed. In one example, the turbine speed assessed at 210 may be compared relative to a first, lower threshold speed to determine whether to deactivate the second compressor. In comparison, the turbine speed assessed at 216 may be compared relative to a second, higher threshold speed to determine if a hardware limit has been reached, and whether to reactivate the second compressor.

If the turbocharger shaft speed (as determined from the first compressor speed or the turbine speed) is lower than the threshold speed, then at 217, the method includes maintaining operation of the first compressor (of the turbocharger) by maintaining a position of one or more actuators at the current position. Specially, the method includes continuing to flow compressed air to the piston engine via (only) the first compressor and while bypassing the second compressor by maintaining the bypass valve at the current position while continuing to spin the first compressor.

In response to the shaft speed of the turbocharger being at or above the threshold speed, the method includes accelerating the second compressor to reduce the load (and thereby the shaft speed) of the first compressor. Specifically, at 218, the method includes estimating a second compressor speed (or supercharger power) required to lower the shaft speed of the first compressor based on the shaft speed relative to the threshold, while maintaining engine boost pressure.

Therein, first the desired boost pressure may be determined based on desired air mass flow (driver torque demand). Shaft speed of the turbocharger may then be calculated (that is, predicted) based on the engine operating conditions.

If the predicted turbocharger shaft speed (or predicted turbine speed or first compressor speed), as based on desired boost pressure, is greater than the maximum speed limit, the supercharger power (specifically, supercharger speed) required to reduce the turbocharger shaft speed to a safe value may then be determined using a model based on a desired pressure ratio and an estimated air mass flow.

At 220, the method includes comparing the estimated second compressor speed to a threshold speed. The threshold speed may be based on a maximum power available from the electric supercharger. If the estimated second compressor speed is below the threshold speed of the second compressor (that is, the power requested from the supercharger is less than the maximum power drawable from the supercharger), then the method includes accelerating the second compressor at 222 to reduce the load, and the shaft speed of the first compressor. Accelerating the second compressor includes not bypassing the second compressor while continuing to provide compressed air through the first compressor. The accelerating further includes operating the electric motor based on a signal from the controller at a speed based on the outlet temperature of the first compressor relative to the threshold, the speed of the electric motor increased as the outlet temperature of the first compressor exceeds the threshold. Additionally, the electric motor may be accelerated by the controller sending a signal to an actuator that closes, or reduces slippage of, the clutch coupled between the engine crankshaft and the second compressor, thereby transferring engine torque from the crankshaft to the second compressor. The second compressor may be accelerated until the turbocharger shaft speed is below the threshold speed. Then, the second compressor may be decelerated and boost pressure may resume being delivered via the first compressor only.

Figure 3:
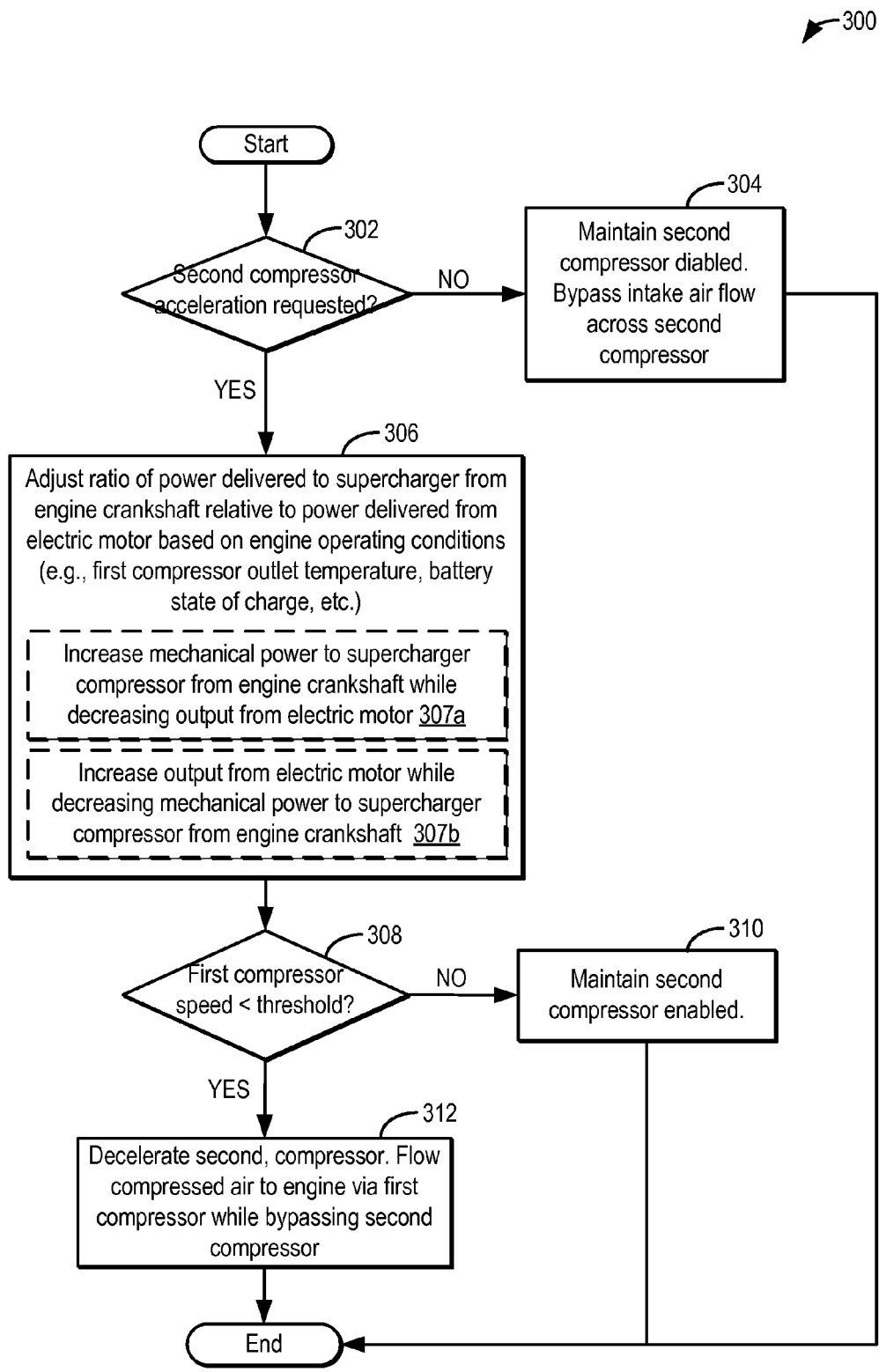
FIG. 3 shows a high level flow chart illustrating a routine that may be implemented for accelerating a supercharger compressor using a variable ratio of power from an electric motor and power from an engine crankshaft.

If the estimated second compressor speed required to control turbocharger shaft speed is above the threshold speed of the second compressor (that is, the power requested from the supercharger is at or more than the maximum power drawable from the supercharger), then at 224, the method includes adjusting a ratio of power delivered to the second compressor from the electric motor relative to the crankshaft (as detailed at FIG. 3). As such, the supercharger compressor may be driven mechanically via the crankshaft coupled to the engine and/or electrically via the electric motor. In one example, responsive to the turbocharger shaft speed exceeding the threshold, the driving of the second compressor via the crankshaft may be increased while the driving of the second compressor via the electric motor may be correspondingly decreased. By adjusting the ratio of driving the second compressor via the crankshaft relative to via the electric motor based on the outlet temperature of the first compressor, the supercharger compressor speed may be used to control the turbocharger speed without incurring boost errors or overheating the supercharger compressor.

At 226, the method further includes accelerating the second compressor while limiting the engine torque. Limiting the engine torque may include one or more of reducing boost pressure and reducing engine intake airflow through the first compressor. For example, intake airflow may be reduced by adjusting an electromechanical actuator coupled to a throttle plate in the intake system to rotate the throttle valve to a less open position by sending a control signal from the controller to the actuator. For example, engine torque output may be clipped and boost pressure may be correspondingly reduced. Boost pressure may be reduced by the controller sending signals to a combination of actuators including but not limited to a wastegate actuator, the first compressor, and the CRV. For example the signals may increase rotation of the first compressor, reduce an opening of the wastegate, reduce an opening of the CRV, or a combination thereof. Herein, the limiting may be based on a difference between the estimated compressor speed and the threshold speed. For example, as the second compressor speed (or power) exceeds the threshold speed, the limiting may be increased and the amount of intake airflow delivered to the engine may be decreased.

Now turning to FIG. 3, method 300 depicts a routine for adjusting a ratio of power delivered to a supercharger compressor via an electric motor relative to an engine crankshaft.

At 302, the method includes confirming that second compressor acceleration (of a supercharger compressor) has been requested. In one example, second compressor acceleration may have been requested to reduce the load, and thereby the shaft speed, of an upstream turbocharger compressor. If second compressor acceleration is not requested, at 304, the supercharger compressor may remain disabled and compressed air may be flowed to the engine via the first compressor, while bypassing the second compressor.

If second compressor acceleration is requested, then at 306, the method includes adjusting a ratio of driving the second (supercharger) compressor mechanically via the crankshaft relative to driving the second (supercharger) compressor electrically via the electric motor. The adjusting may be based on engine operating parameters such as first compressor shaft speed, turbine speed, first compressor temperature, battery state of charge, etc. The adjusting may include increasing mechanical power delivered to the supercharger compressor from the engine crankshaft while correspondingly decreasing an output from the electric motor at 307a. In another example, the adjusting may include increasing output from the electric motor while correspondingly decreasing mechanical power to the supercharger compressor from the engine crankshaft (e.g., by increasing slipping the clutch between the crankshaft and the supercharger compressor shaft by sending a signal to a clutch actuator from the controller). As one example, when the battery state of charge is lower, a higher ratio of driving the second (supercharger) compressor mechanically via the crankshaft relative may be applied relative to driving the second (supercharger) compressor electrically via the electric motor. As another example, when the first compressor outlet temperature is higher, a higher ratio of driving the second (supercharger) compressor mechanically via the crankshaft relative may be applied relative to driving the second (supercharger) compressor electrically via the electric motor.

At 308, it may be determined if the turbocharger shaft speed, or first compressor speed, is lower than the threshold speed. If not, the method includes maintaining the second compressor enabled and accelerating the second compressor until the first compressor shaft speed is lower than the threshold speed. At 310, when the first compressor shaft speed is lower than the threshold speed, the second compressor may be decelerated and disabled. Thereafter the engine may be provided boosted air from only the first compressor.

In this way, a method for a boosted engine includes, during a first condition, in response to a shaft speed of a first, upstream compressor being higher than a threshold, accelerating a second, downstream compressor at a first speed while maintaining boost pressure; and during a second condition, in response to the shaft speed of the first compressor being higher than the threshold, accelerating the second compressor at a second speed while reducing boost pressure. Herein, the second speed is higher than the first speed. In the above embodiment, during each of the first and second conditions, compressed air is flowed to a piston engine via the first compressor, and accelerating the second compressor includes discontinuing bypassing the second compressor. In any of the preceding embodiments, a difference between the shaft speed and the threshold is larger during the second condition as compared to the first condition. Further, the second compressor is driven by one or more of a battery-operated electric motor and an engine crankshaft, while the first compressor is driven by a turbine. Further, during the second condition, the accelerating of the second compressor is performed with a lower ratio of motor torque from the electric motor relative to engine torque from the crankshaft, while during the first condition, the accelerating of the second compressor is performed with a higher ratio of motor torque from the electric motor relative to engine torque from the crankshaft. In any of the preceding embodiments, each of the first and second conditions includes an increase in driver demand, the increase in driver demand during the second condition being larger than the increase in driver demand during the first condition.

Figure 4:
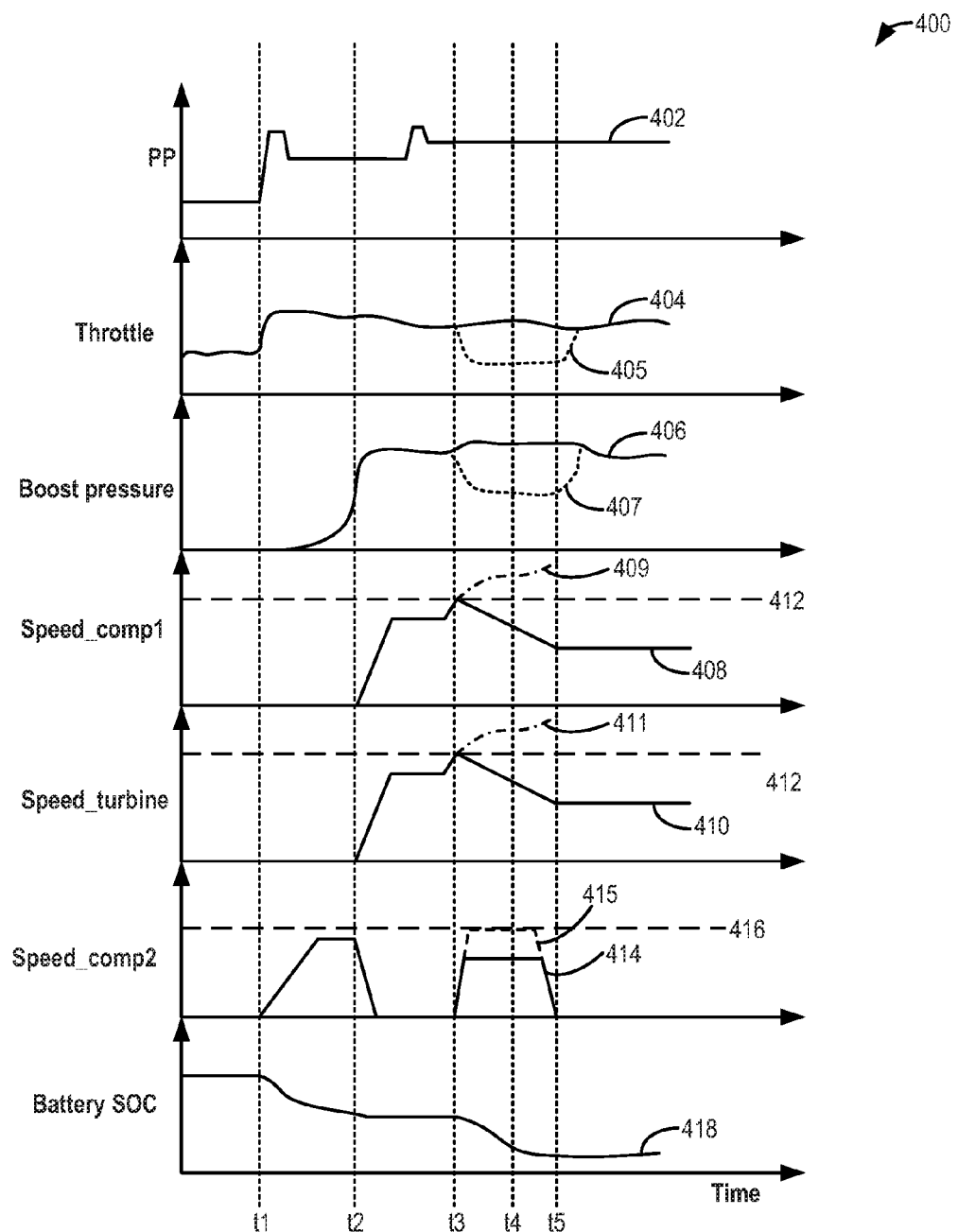
FIG. 4 shows example adjustments that may be used to reduce over-speed of a turbocharger staged downstream of a supercharger compressor.

Turning now to FIG. 4, an example map 400 is shown for improving shaft speed control for an upstream turbocharger via operation of a downstream supercharger. Map 400 depicts pedal position (PP) at plot 402, intake throttle opening at plot 404, boost pressure at plot 406, the speed of a first upstream compressor of the turbocharger (speed_comp1) at plot 408, the speed of a turbine coupled to the first compressor via a turbocharger shaft (speed_turbine) at plot 410, the speed of a second downstream compressor of the supercharger (speed_comp2) at plot 414, and the state of charge of a system battery coupled to the electric motor of the supercharger at plot 418. All plots are shown over time, along the x-axis. Note that elements aligning at a common time on the graph, such as at time t1, for example, are occurring concurrently, including for example where one parameter is increasing while another parameter is decreasing.

Prior to t1, the engine may be operating un-boosted due to a lower operator torque demand and vehicle speed. At t1, in response to a tip-in (plot 402), boost may be demanded. To reduce turbo lag, in response to the boost demand, the second compressor is accelerated for a duration from t1 to t2 to raise the boost pressure. Herein, the second compressor may be accelerated via operation of an electric motor, resulting in a corresponding drop in battery state of charge.

Between t1 and t2, as boosted engine operation ensues, and exhaust gas temperature and pressure increases, the turbine of the turbocharger may spool up, such that at t2, the first compressor can be accelerated. At t2, once the first compressor is spooled up and running, the second compressor may be decelerated. In addition, air compressed by the first compressor may be delivered to the engine while bypassing the second compressor. Between t2 and t3, torque demand and boost pressure may be provided via the first compressor only.

At t3, the turbocharger compressor may reach a threshold speed 412. The threshold speed may correspond to a hardware limit, continued operation above which can adversely affect turbocharger components, such as the turbocharger shaft coupling the first compressor to the turbine. As such, due to the coupling, at t3, the turbocharger turbine may also reach the threshold speed 412. Therefore to enable shaft speed control, at t3, the supercharger is re-enabled and the second compressor is accelerated for a duration from t3 to t5. Specifically, the second compressor is operated at a speed that allows for the load of the first compressor to be reduced while maintaining boost pressure. The reduction in first compressor load allows for the first compressor speed, and therefore first turbine speed and turbocharger shaft speed, to be reduced. As such, in the absence of the second compressor operation, the first compressor speed may have continued to increase, as indicated by dashed and dotted segment 409, and the turbine speed may also have continued to increase, as indicated by dashed and dotted segment 411.

In particular, a second compressor speed is determined that corresponds to a supercharger power or load that allows for turbocharger speed control. In the depicted example, the second compressor speed (plot 414) is within a limit 416 of the supercharger. In an alternate example, if the second compressor speed required to control the turbocharger overspeed condition is higher than limit 416, then the supercharger compressor may be operated at the speed limit (as indicated by dashed segment 415), while limiting boost pressure (as indicated at dashed segment 407). In one example, boost pressure is limited by decreasing intake airflow by reducing the opening of an intake throttle (as indicated at dashed segment 405). The limiting of the boost pressure in addition with the supercharger compressor acceleration may enable the turbocharger speed to be controlled.

In one example, between t3 and t5, the supercharger compressor may be accelerated via power from the electric motor with a resulting drop in battery state of charge. However, in the depicted example, due to the battery state of charge becoming low at t4, between t4 and t5, supercharger compressor acceleration may be achieved by reducing electric motor output (or motor torque) delivered to the supercharger compressor (as indicated by no further drop in battery SOC) and increasing engine torque delivered to the supercharger compressor (via the engine crankshaft).

At t4, when the first compressor speed is sufficiently under control, the second compressor of the supercharger may be decelerated and the first compressor of the turbocharger may be accelerated to meet the boost demand.

In one example, an engine system comprises: an engine having an intake; a first intake compressor driven by an exhaust turbine; a second intake compressor driven by an electric motor, the motor powered by a battery, the second compressor positioned downstream of the first compressor along the intake; a speed sensor coupled to a shaft of the first compressor; and a controller. The controller may be configured with computer readable instructions stored on non-transitory memory for: in response to a tip-in, operating the second compressor with the first compressor disabled until a turbine speed is higher than a threshold turbine speed; then, bypassing the second compressor while operating the first compressor; and in response to a shaft speed of the first compressor being higher than a threshold speed, while continuing to operate the first compressor, spinning the second compressor. In the preceding embodiment, the controller may include further instructions for, spinning the second compressor until the shaft speed of the first compressor is lower than the threshold speed, and after the shaft speed of the first compressor is decreased, disabling the second compressor and providing compressed air to the engine via the first compressor only. In the preceding embodiments, spinning the second compressor includes spinning the electric motor at a speed based on a difference between the shaft speed and the threshold speed, the electric motor speed increased up to a threshold motor speed as the difference increases, a boost pressure of the engine maintained while the electric motor speed is increased up to the threshold motor speed. In any of the preceding embodiments, the controller includes further instructions for: after the electric motor speed is increased to the threshold motor speed, maintaining the electric motor speed at the limit while limiting boost pressure, the limiting based on the shaft speed. In any of the preceding embodiments, limiting boost pressure includes reducing a speed of the first compressor and/or reducing an opening of an intake throttle positioned upstream of the first compressor in the engine intake.

In a further representation, a method for a boosted engine includes, providing a flow of compressed air to a piston engine via a second compressor while bypassing a first compressor, the second compressor positioned downstream of the first compressor, the first compressor coupled to a turbine. In response to turbine speed being higher than a first threshold speed, decelerating the second compressor, and providing a flow of compressed air to the piston engine via the first compressor while bypassing the second compressor. Then, in response to the turbine speed being higher than a second threshold speed, higher than the first threshold speed, accelerating the second compressor, and providing a flow of compressed air to the piston engine via each of the first compressor and the second compressor. Herein, the first threshold is based on turbo lag and the second threshold is based on a hardware limit.

In another further representation, a method for a boosted engine includes, during a tip-in, providing compressed air to an engine via a second, downstream compressor while bypassing a first, upstream compressor until first compressor speed reaches a first threshold. Herein, the first compressor is driven by a turbine while the second compressor is driven at least in part by an electric motor. Providing compressed air via the second compressor includes accelerating the second compressor via the electric motor. Then, transitioning to providing compressed air to the engine via the first compressor while bypassing the second compressor until first compressor speed reaches a second threshold, higher than the first threshold. Bypassing the second compressor includes opening a bypass valve in a bypass coupled across the second compressor and/or decelerating the second compressor. In response to the first compressor speed reaching the second threshold, the method further includes accelerating the second compressor until the first compressor speed is below the second threshold, but above the first threshold. Compressed air is provided to the engine via each of the first and second compressor until the first compressor speed is controlled.

In this way, an electric supercharger may be used to reduce the likelihood of over-speeding at an upstream turbocharger, such as in aggressively downsized engines. By using the supercharger to reduce the load, and the speed, of the turbocharger compressor, hardware constraints may be reduced without incurring a loss of boost pressure and driveability. Overall, turbocharger component life is expended without degrading the engine's ability to meet driver demanded torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted piston engine, comprising:
   bypassing a second compressor and providing a flow of compressed air to the piston engine via a first compressor, wherein the first compressor is staged downstream of the second compressor along an air intake passage; and
   in response to a shaft speed of the first compressor being at or above a threshold, accelerating the second compressor.

2. The method of claim 1, further comprising, accelerating the second compressor until the shaft speed of the first compressor is below the threshold, and then decelerating the second compressor.

3. The method of claim 1, wherein accelerating the second compressor includes not bypassing the second compressor while continuing to provide compressed air via the first compressor.

4. The method of claim 1, wherein the second compressor is driven by an electric motor and wherein the first compressor is driven by an exhaust turbine via a shaft.

5. The method of claim 4, wherein accelerating the second compressor includes operating the electric motor at a speed based on the shaft speed of the first compressor relative to the threshold, the speed of the electric motor increased as the shaft speed of the first compressor exceeds the threshold.

6. The method of claim 1, wherein the threshold is a first threshold, wherein accelerating the second compressor includes estimating a second compressor speed required to lower the shaft speed of the first compressor based on the shaft speed of the first compressor relative to the first threshold, and when the estimated second compressor speed is below a second threshold, accelerating the second compressor to the second threshold, and when the estimated second compressor speed is above the second threshold, adjusting a ratio of power delivered to the second compressor from an electric motor relative to an engine crankshaft while limiting engine torque.

7. The method of claim 6, wherein limiting engine torque comprises limiting engine torque based on a difference between the estimated second compressor speed and the second threshold.

8. The method of claim 6, wherein limiting engine torque includes one or more of reducing boost pressure and intake airflow through the first compressor.

9. A method for a boosted engine, comprising:
during a first condition, in response to a shaft speed of a first, downstream compressor being higher than a threshold, accelerating a second, upstream compressor at a first speed while maintaining boost pressure; and
during a second condition, in response to the shaft speed of the first compressor being higher than the threshold, accelerating the second compressor at a second speed while reducing boost pressure.

10. The method of claim 9, wherein the second speed is higher than the first speed.

11. The method of claim 9, wherein during each of the first and second conditions, compressed air is flowed to a piston engine via the first compressor, and wherein accelerating the second compressor includes discontinuing bypassing the second compressor.

12. The method of claim 9, wherein each of the first and second conditions includes an increase in driver demand, and wherein the increase in driver demand during the second condition is larger than the increase in driver demand during the first condition.

13. The method of claim 9, wherein the first compressor is driven by a turbine via a shaft and the second compressor is driven by one or more of a battery-operated electric motor and an engine crankshaft, and wherein a difference between the shaft speed and the threshold is larger during the second condition as compared to the first condition.

14. The method of claim 13, wherein during the second condition, the accelerating of the second compressor is performed with a lower ratio of motor torque from the electric motor relative to engine torque from the crankshaft, and during the first condition, the accelerating of the second compressor is performed with a higher ratio of motor torque from the electric motor relative to engine torque from the crankshaft.

15. An engine system, comprising:
an engine having an intake;
a first intake compressor driven by an exhaust turbine;
a second intake compressor driven by an electric motor, the motor powered by a battery, the second compressor positioned upstream of the first compressor along the intake;
a speed sensor coupled to a shaft of the first compressor; and
a controller with computer readable instructions stored on non-transitory memory for:
in response to a tip-in,
operating the second compressor with the first compressor disabled until a turbine speed is higher than a threshold turbine speed;
then, bypassing the second compressor while operating the first compressor; and
in response to a shaft speed of the first compressor being higher than a threshold shaft speed, while continuing to operate the first compressor, spinning the second compressor.

16. The system of claim 15, wherein the controller includes further instructions for, spinning the second compressor until the shaft speed of the first compressor is lower than the threshold shaft speed, and then disabling the second compressor and providing compressed air to the engine via the first compressor only.

17. The system of claim 15, wherein spinning the second compressor includes spinning the electric motor at a speed based on a difference between the shaft speed and the threshold shaft speed, the electric motor speed increased up to a threshold motor speed as the difference increases, a boost pressure of the engine maintained while the electric motor speed is increased up to the threshold motor speed.

18. The system of claim 17, wherein the controller includes further instructions for: after the electric motor speed is increased to the threshold motor speed, maintaining the electric motor speed at the threshold motor speed while limiting boost pressure, the limiting based on the shaft speed.

19. The system of claim 18, wherein limiting boost pressure includes reducing a speed of the first compressor and/or reducing an opening of an intake throttle positioned upstream of the first compressor in the engine intake.

* * * * *